(12) United States Patent
Xu et al.

(10) Patent No.: US 11,789,999 B2
(45) Date of Patent: Oct. 17, 2023

(54) HEURISTIC VIDEO SEARCHING

(71) Applicant: International Business Machines Corporation, Armonk, NY (US)

(72) Inventors: Jing Xu, Xian (CN); Jian Jun Wang, Xi'an (CN); Xue Ying Zhang, Xi'an (CN); Xing Wei, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 17/109,380

(22) Filed: Dec. 2, 2020

(65) Prior Publication Data
US 2022/0171808 A1 Jun. 2, 2022

(51) Int. Cl.
*G06F 16/732* (2019.01)
*G06F 16/185* (2019.01)
*G06F 16/738* (2019.01)
*G06N 3/126* (2023.01)
*H04N 21/234* (2011.01)
*G06V 20/40* (2022.01)

(52) U.S. Cl.
CPC ........ *G06F 16/7328* (2019.01); *G06F 16/185* (2019.01); *G06F 16/738* (2019.01); *G06N 3/126* (2013.01); *G06V 20/49* (2022.01); *H04N 21/23418* (2013.01)

(58) Field of Classification Search
None
See application file for complete search history.

(56) References Cited

U.S. PATENT DOCUMENTS

| | | |
|---|---|---|
| 7,555,046 B2 | 6/2009 | Zoghlami |
| 2008/0071929 A1* | 3/2008 | Motte ............... H04L 67/53 709/217 |
| 2011/0040562 A1* | 2/2011 | Doyle ............... H04L 63/30 704/235 |

(Continued)

FOREIGN PATENT DOCUMENTS

CN 104598561 A 5/2015

OTHER PUBLICATIONS

"System and method for automatic video classification with dynamic chunking & tagging", ip.com, IPCOM000256783D, <https://priorart.ip.com/IPCOM/000256783>, Electronic Publication Date: Dec. 29, 2018, 7 pages.

(Continued)

*Primary Examiner* — Richard L Bowen
(74) *Attorney, Agent, or Firm* — Joseph P. Curcuru

(57) ABSTRACT

In an approach to improve video searching embodiments execute heuristic video searching based on importance of semantic features. Embodiments perform hierarchical aggregation of a parsed video into one or more clusters of video excerpts based on a plurality of video features, and display a word cloud to a user to guide feedback. Embodiments traverse the one or more clusters based on a data structure of the hierarchical aggregation and the feedback. Additionally, responsive to reaching selected leaf nodes of the data structure, embodiments generate one or more snapshots of the video excerpts associated with the leaf nodes, wherein the leaf nodes are selected based on the feedback. Further, embodiments display the one or more generated snapshots of the video excerpts to the user.

20 Claims, 4 Drawing Sheets

(56) References Cited

U.S. PATENT DOCUMENTS

| | | | | |
|---|---|---|---|---|
| 2011/0282919 | A1* | 11/2011 | Sweeney | G06F 16/34 707/E17.03 |
| 2012/0136987 | A1* | 5/2012 | Bostick | G06F 16/81 715/779 |
| 2013/0279810 | A1* | 10/2013 | Li | G06V 20/42 382/195 |
| 2015/0244829 | A1* | 8/2015 | Ethington | G06F 3/017 715/753 |
| 2019/0236371 | A1* | 8/2019 | Boonmee | G06V 10/764 |
| 2019/0251400 | A1* | 8/2019 | Takahashi | G06F 16/9024 |
| 2022/0076024 | A1* | 3/2022 | Walker | G06V 20/49 |

OTHER PUBLICATIONS

Binucci et al., "Fully Dynamic Semantic Word Clouds", 2016 7th International Conference on Information, Intelligence, Systems & Applications (IISA), Chalkidiki, 2016, pp. 1-6.

Elmagarmid et al., "InsightVideo: Towards hierarchical video content organization for efficient browsing, summarization and retrieval", ResearchGate, <https://www.researchgate.net/publication/2928209>, Mar. 2004, 31 pages.

Hampapur et al., "Searching surveillance video", 2007 IEEE Conference on Advanced Video and Signal Based Surveillance, AVSS 2007, London, 2007 pp. 75-80.

Koul, Arnesh, "Understanding YouTube's Algorithm in 2019", blog post, <http://social.colostate.edu/2019/04/02/youtube-algorithm/>, Apr. 2, 2019, 8 pages.

Protasov et al., "Using Deep Features for Video Scene Detection and Annotation", ResearchGate, uploaded on Jan. 25, 2018, <https://www.researchgate.net/publication/322689707>, 22 pages.

Zhang et al., "Human Motion Parsing by Hierarchical Dynamic Clustering", <https://www.is.mpg.de/uploads_file/attachment/attachment/442/1000-v2.pdf>, 2018, 13 pages.

* cited by examiner

HEURISTIC VIDEO SEARCHING

BACKGROUND OF THE INVENTION

The present invention relates generally to the field of video searching, and more particularly to heuristic video searching.

A video search engine is a web-based search engine which crawls the web for video content. Some video search engines parse externally hosted content while others allow content to be uploaded and hosted on their own servers. Some engines also allow users to search by video format type and by length of the clip. The video search results are usually accompanied by a thumbnail view of the video.

Video search engines are computer programs designed to find videos stored on digital devices, either through internet servers or in storage units from the same computer. These searches can be made through audiovisual indexing, which can extract information from audiovisual material and record it as metadata, which will be tracked by search engines. Search engine optimization indexing collects, parses, and stores data to facilitate fast and accurate information retrieval. Index design incorporates interdisciplinary concepts from linguistics, cognitive psychology, mathematics, informatics, and computer science. An alternate name for the process in the context of search engines designed to find web pages on the internet is web indexing.

Popular engines focus on the full-text indexing of online, natural language documents. Media types such as video, audio, and graphics are also searchable. Meta search engines reuse the indices of other services and do not store a local index, whereas cache-based search engines permanently store the index along with the corpus. Unlike full-text indices, partial-text services restrict the depth indexed to reduce index size. Larger services typically perform indexing at a predetermined time interval due to the required time and processing costs, while agent-based search engines index in real time.

SUMMARY

Embodiments of the present invention disclose a method, a computer program product, and a system for heuristic video searching based on importance of semantic features, the computer-implemented method comprising: performing hierarchical aggregation of a parsed video into one or more clusters of video excerpts based on a plurality of video features; displaying, by a user interface on a computing device, a word cloud to a user to guide feedback, wherein words in the word cloud are constructed based on importance of one or more semantic features, and wherein font size of words in the word cloud is based on relative importance of respective semantic features of the one or more clusters; traversing the one or more clusters based on a data structure of the hierarchical aggregation and the feedback; responsive to reaching selected leaf nodes of the data structure, generating one or more snapshots of the video excerpts associated with the leaf nodes, wherein the leaf nodes are selected based on the feedback; and displaying, by the user interface on the computing device, the one or more generated snapshots of the video excerpts to the user.

DETAILED DESCRIPTION

Figure 1:
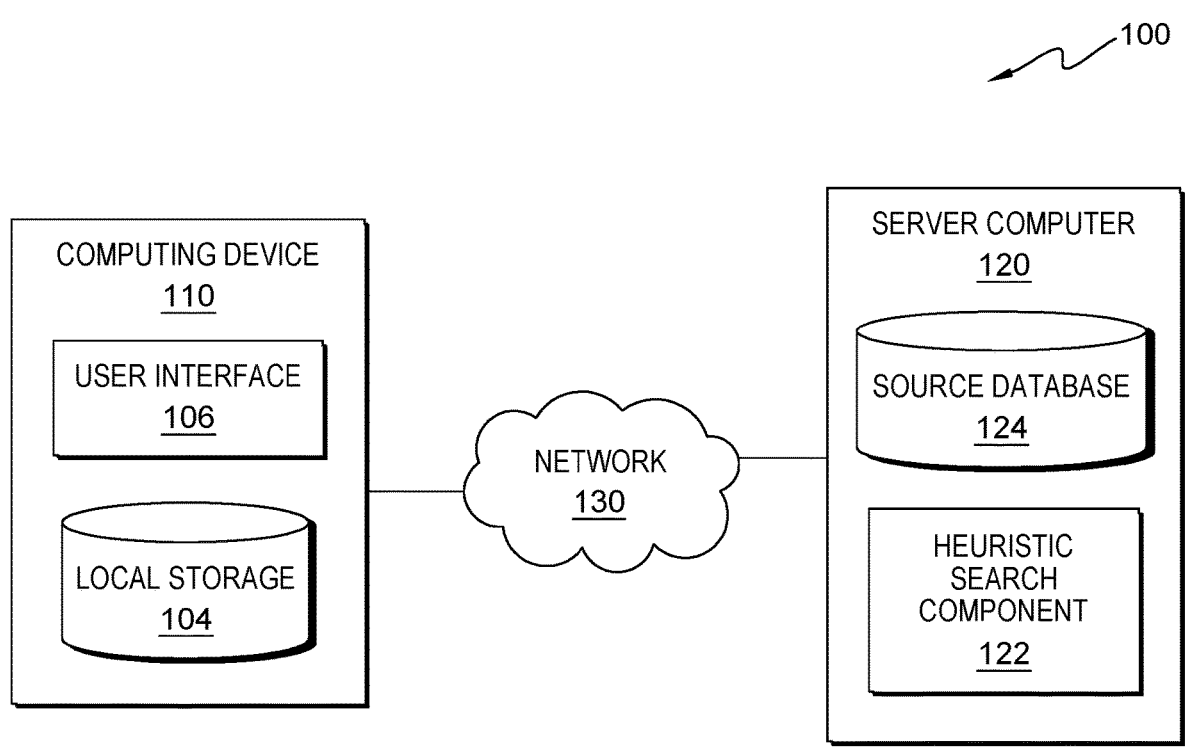
FIG. 1 is a functional block diagram illustrating a distributed data processing environment, in accordance with an embodiment of the present invention.

Earliest Currently in the art, vast amounts of videos are available in daily life. For example, surveillance cameras have been distributed in every street in some cities across the globe, constantly monitoring and recording day and night. At the same time of improving social security, massive video information is generated. Embodiments of the present invention recognize that searching on a given video source can be time consuming for human operator, if timestamp information is not accurate, not mentioning the terrible load if multiple video sources are involved. Embodiments of the present invention recognize that locating and identifying desired video information from large videos (e.g., large video files) is challenging.

Embodiments of the present invention recognize that some online video content providers (i.e., companies) provide users with a video search function. Embodiments of the present invention recognize that some online video content providers advise uploaders that "All of the metadata for a video should accurately describe the video content. Be sure to optimize the Titles, Descriptions, Tags, and add Closed Captions." Embodiments of the present invention recognize that, currently in the art, feedback to a viewer's query is based on matching these metadata the uploader prepared. However, embodiments of the present invention recognize that such methods are not applicable to many videos, such as most surveillance videos.

Embodiments of the present invention recognize that there are also video researches done by limiting/filtering for object features, wherein the object features comprise: object color, object class, object size, object shape, object location, object movement, time of event of occurrence and event duration. Embodiments of the present invention recognize that for vast videos, it is very time consuming to go through each video with such searching method. Embodiments of the present invention recognize that an efficient method is needed.

Embodiments of the present invention improve the art by solving the issues state above. Embodiments of the present invention solve the particular problems stated above by executing a heuristic video search based on the importance of semantic features. Embodiments of the present invention improve the art by: (i) performing hierarchical clustering to parsed videos based on a plurality of features (e.g., video features including semantic features), (ii) presenting the user a word cloud to guide user's feedback, (iii) determining and/or constructing words in the word cloud based on importance of semantic features, (iv) using cluster importance of the semantic features to decide font size of words in the word cloud, (v) receiving a degree of confidence from a user for the user's choice on the element of the word cloud, (vi) determining the next level of clusters or leaves by structuring of hierarchical clustering results, as well as user feedback, and (vii) presenting the snapshots of selected videos (i.e., video excerpts) and ranking the presented video snapshots (i.e., video excerpts) using predetermine confidence scores, if one or more leaf nodes are reached. Additionally, embodiments of the present invention improve the art by guiding a user, based on a displayed word cloud, to recall and choose the features (e.g., keywords) that are beneficial for the video search process together with user provided information on not only the features chosen, but also degree of confidence, resulting in the search process being more targeted/focused and efficient.

Implementation of embodiments of the invention may take a variety of forms, and exemplary implementation details are discussed subsequently with reference to the Figures (i.e., FIG. 1-FIG. 4).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 4.

User interface (interface) 106 provides an interface to the automated feedback and heuristic search component (search component) 122. Computing device 110, via user interface 106, may enable a user and/or a client to interact with search component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. Interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 4. In some embodiments server computer 120 may represent a plurality of server computers.

Each of shared storage 124 and local storage 104 may be a data/knowledge repository and/or a database that may be written and/or read by one or a combination of search component 122, server computer 120 and computing device 110. In the depicted embodiment, shared storage 124 and target database 128 reside on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In the depicted embodiment, search component 122 is executed on server computer 120. In other embodiments, search component 122 may be executed on computing device 110. In various embodiments of the present invention, not depicted in FIG. 1, search component 122 may execute on a plurality of server computers 120 and/or on a plurality of computing devices 110. In some embodiments, search component 122 may be located and/or executed anywhere within distributed data processing environment 100 as long as search component 122 is connected to and/or communicates with database engine 140, computing device 110, and/or server computer 120, via network 130.

In various embodiments of the present invention search component 122 receives parsed videos as input. In some embodiments of the present invention search component 122 receives videos inputs to our system are parsed videos. Search component 122 parses the received videos to remove redundant frames is common operation in video processing. One or more parsed videos can be segmented into meaningful chunks (with standard scene detection methods, wherein, each piece of the parsed video after redundant frames are removed is labeled/identified as a "meaningful chunk." For example, a 30 minute video on a road with only 30 seconds of a person moving through the frame, and the rest of the video frames almost identical to each other can be reduced to a chunk with 35 seconds, including the 30 seconds of the person moving through the frame.

Search component 122 can extract a plurality of video features, including semantic features of the parsed videos, wherein the extracted semantic features comprise: objects (e.g., street, tree, individual people, car, truck, bus, bicycle, motorcycle, sidewalk, and/or any object known in the art) and image properties of objects, such as color, size, location, direction, gesture, and/or any other image property known in the art. Video features are video features as they are known and understood in the art.

In various embodiments of the present invention, search component clusters the parsed videos into a hierarchical cluster according to the plurality of features. An illustration of hierarchically clustering structure is given in FIG. 2. Top level 202 is determined by user interface design (e.g., design on interface 106) and/or clustering criteria such as Akaike information criterion (AIC), Bayesian information criterion (BIC), and/or other statistical techniques known in the art. AIC and BIC are probabilistic statistical measures that attempt to quantify both the model performance on the training dataset and the complexity of the model. The benefit of these information criterion statistics is that they do not require a hold-out test set, although a limitation is that they do not take the uncertainty of the models into account and may end-up selecting models that are too simple. The AIC statistic, as illustrated by Equation 1, is defined for logistic regression, where N is the number of examples in the training dataset, LL is the log-likelihood of the model on the training dataset, and k is the number of parameters in the model. The BIC statistic, as illustrated by Equation 2, is calculated for logistic regression, where log( ) has the base-e called the natural logarithm, LL is the log-likelihood of the model, N is the number of examples in the training dataset, and k is the number of parameters in the model.

$$AIC = \frac{-2}{N} \times LL + 2 \times \frac{k}{N} \qquad \text{Equation 1}$$

$$BIC = -2 \times LL + \log(N) \times k \qquad \text{Equation 2}$$

Search component 122 can execute drill down 204 until drill down leaf 206 is reached. In some embodiments of the present invention, search component 122 present a word cloud to the user, via interface 106, to guide user's feedback, wherein the feature with higher importance value in the search comprise a respective larger font size in the word cloud, which in turn attracts more attention from user. In various embodiments of the present invention, search component 122 assume the user doesn't necessarily have the features ready when conducting a video search, wherein the word cloud helps the user to recall some of the key features to identify one or more videos of interest (i.e., one or more target videos). Additionally, the word cloud may guide the user to recall and choose the features that are beneficial for the video search process.

Search component 122 can compute the within-cluster feature importance for the plurality of semantic features for the top level clusters, wherein the feature importance is a number. The feature with a larger number is more important than those with smaller numbers. In various embodiments of the present invention, search component 122 constructs and/or determines a word cloud based on within-cluster semantic features of one or more selected clusters. Within-cluster importance (i.e., within-cluster feature importance) is used to decide whether the input received via user feedback (e.g., user submitted clue) belongs to a particular cluster. The size of the font for a given semantic feature is determined by its within-cluster feature importance value. Within-cluster importance indicates how influential a field is in describing a cluster. In various embodiments of the present invention, importance is defined by comparing the distribution of the field within a cluster with the overall distribution. Within-cluster importance indicates which fields are the most important in defining a single cluster. In various embodiments of the present invention, fields with high within-cluster importance for a cluster tend to have distributions that are significantly different from the overall population, wherein fields with high within-cluster importance are pointers to the cluster, and are identified as candidates to profile an involved cluster. In some embodiments of the present invention, based on the distributions of such fields, marketing plans can be tailored for each cluster in order to improve marketing efficiencies.

In various embodiments of the present invention, search component 122 directs user feedback into the word cloud for illustration, wherein a user selects one or more features, and selects a degree of confidence. For example, a user selects "vehicle color" and then selects vehicle type, search component 122 will prompt the user to provide a confidence level of the selected terms by displaying an interactive prompt on the user's user interface (e.g., interface 106). In one example, the confidence is an interactive slide bar. In some embodiments of the present invention, the confidence selection is manually entered by the user. In other embodiments of the present invention, the degree of confidence is predetermined.

Figure 2:
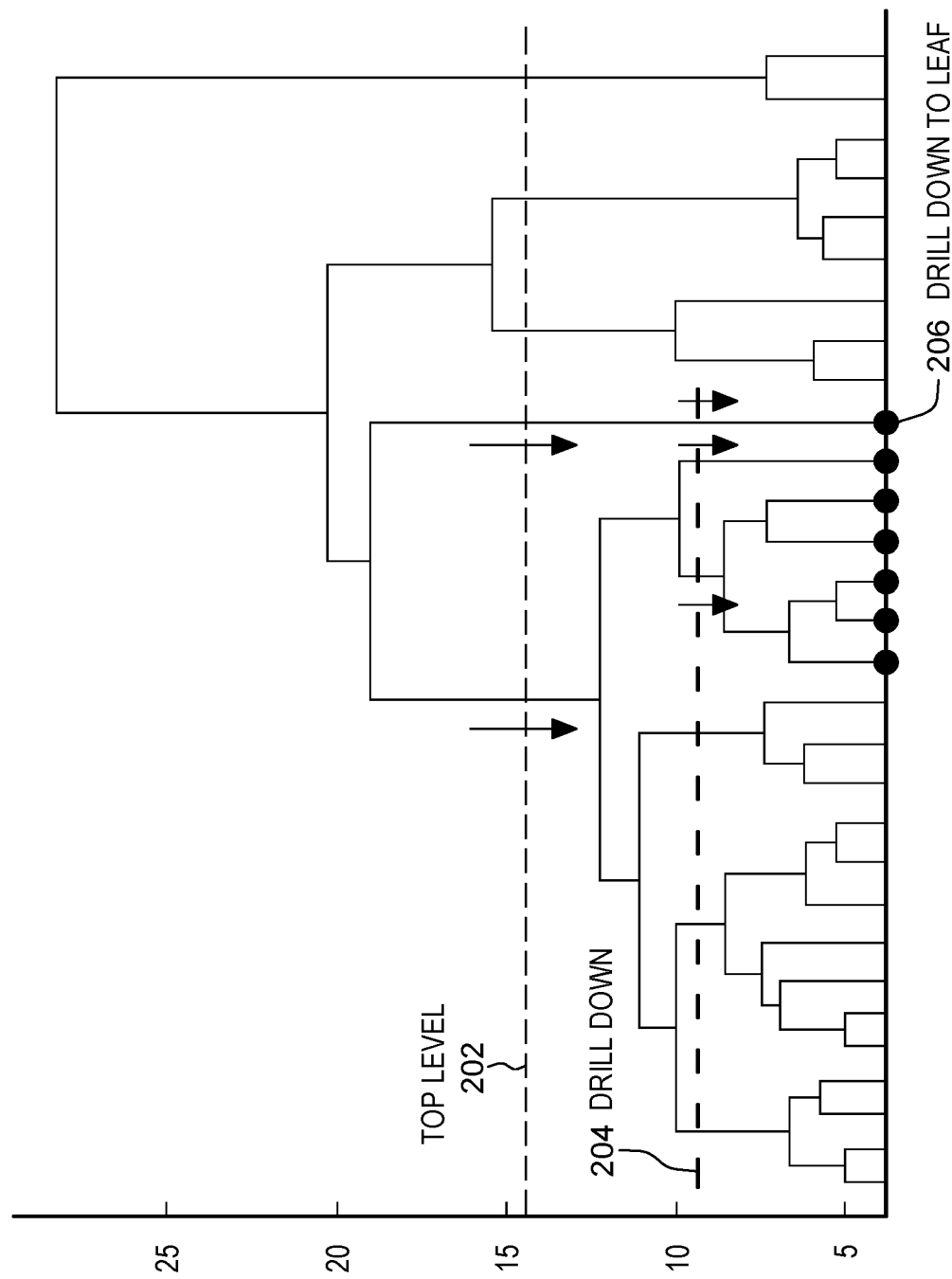
FIG. 2 is a graph illustrating a drill down process in hierarchical clusters, in accordance with an embodiment of the present invention.

In various embodiments of the present invention, search component 122 drills down through the hierarchy, as illustrate in FIG. 2. In various embodiments of the present invention, search component 122 performs hierarchical aggregation (i.e., sorting) of a parsed video into one or more clusters of video excerpts based on the plurality of video features. Search component 122 may identify and lock on one or more candidate clusters based on the user's feedback received. In various embodiments of the present invention, if search component 122 determines that one or more leaf nodes are not reached then search component 122 will regenerate a word cloud based on the within-cluster semantic features of one or more selected clusters. In various embodiments of the present invention, if search component 122 determines that one or more leaf nodes are reached then search component 122 generates one or more snapshots of the videos (video excerpts) in the leaf nodes and displays video excerpts to the user to review, via interface 106, wherein the displayed video excerpts are ranked based on a predetermined level of confidence.

In various embodiments of the present invention, search component 122 performs hierarchical aggregation of a parsed video into one or more clusters of video excerpts based on the plurality of video features. In various embodiments of the present invention, search component 122 displays, by a user interface on a computing device, a word cloud to a user to guide feedback of the user, wherein words in the word cloud are constructed and/or determined based on importance of the one or more semantic features, and wherein font size of words in the word cloud is based on relative importance of respective semantic features of the one or more clusters. Search component 122 may traverse the one or more clusters based on a data structure of the hierarchical aggregation and the feedback of the user. Responsive to reaching selected leaf nodes of the data structure, searching component 122 may generate one or more snapshots of the video excerpts associated with the leaf nodes, wherein the leaf nodes are selected based on the feedback of the user. In various embodiments of the present invention, search component 122 displays, by interface 106 on a computing device, the one or more generated snapshots of the video excerpts to the user.

Figure 3:
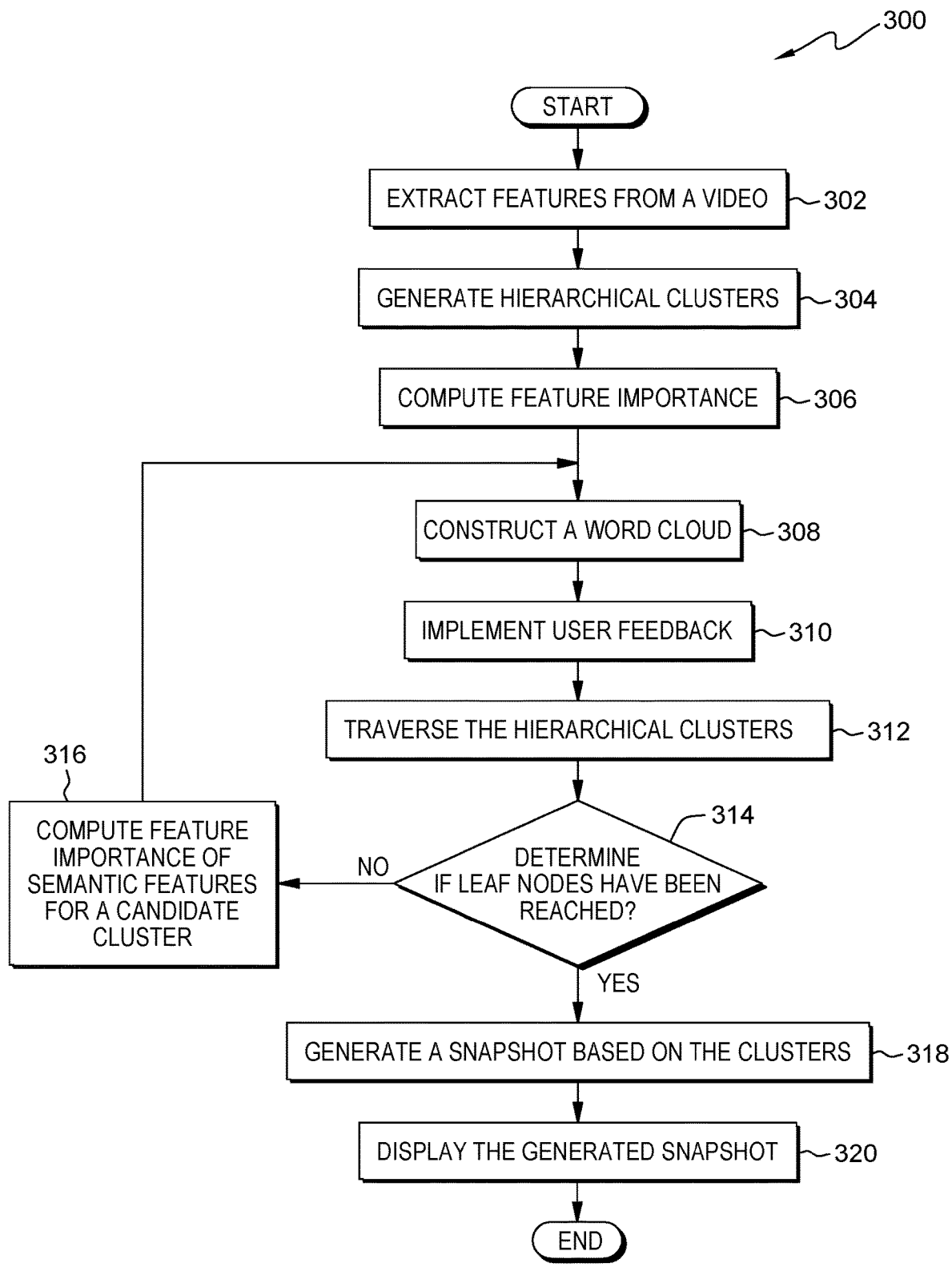
FIG. 3 illustrates operational steps of a hierarchical search component, on a server computer within the distributed data processing environment of FIG. 1, for video searching and identification, in accordance with an embodiment of the present invention.

FIG. 3 illustrates operational steps of search component 122, generally designated 300, in communication with computing device 110, within distributed data processing environment 100 of FIG. 1, for executing a heuristic video search, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, search component 122 extracts features from a video. In various embodiments of the present invention, search component 122 extracts one or more features from one or more received videos (i.e., video features). Search component 122 can extract a plurality of video features, including semantic features of the parsed videos, wherein the extracted semantic features comprise: objects (e.g., street, tree, individual people, car, truck, bus, bicycle, motorcycle, sidewalk, and/or any object known in the art) and image properties of objects, such as color, size, location, direction, gesture, and/or any other image property known in the art.

In step 304, search component 122 generates hierarchical clusters. In various embodiments of the present invention, search component 122 generates one or more hierarchical clusters based on the extracted features from the one or more videos (i.e., video features). In various embodiments of the present invention, the generated hierarchical clusters are displayed, via interface 106.

In step 306, search component 122 computes feature importance. In various embodiments of the present invention, search component 122 computes the within-cluster feature importance for a plurality of video features, including semantic features, for the top level clusters in the generated hierarchical clusters.

In step 308, search component 122 constructs (i.e., generates) a word cloud. In various embodiments of the present invention, search component 122 constructs and/or determines one or more word clouds. In some embodiments of the present invention, the one or more constructed and/or determined word clouds are displayed, via interface 106, and are interactive. In various embodiments of the present invention, searching component 122 generates a word cloud based on semantic features of one or more selected clusters, wherein the word cloud is interactive and relative importance of a cluster is used to determine whether input received via feedback from the user is associated with a particular cluster. In various embodiments of the present invention, the generated word cloud is displayed to the user via interface 106. In various embodiments of the present invention, searching component 122 receives feedback and an assigned confidence level from the user associated with the feedback of the user, wherein the feedback is based on the displayed word cloud.

In step 310, search component 122 implements user feedback. In various embodiments of the present invention, search component 122 receives user feedback, wherein the user feedback is based on the generated one or more word clouds. In some embodiments of the present invention, search component 122 receives an assigned confidence level from the user associated with the user's feedback. In various embodiments of the present invention, searching component 122 guides the user to recall and choose video features that are beneficial for the video searching based on the displayed word cloud, wherein the video features having relatively higher importance value in the searching are indicated by a respective larger font size in the word cloud.

In step 312, search component 122 drills down (i.e., traverses) the hierarchical clusters. In various embodiments of the present invention, search component 122 traverses one or more of the generated hierarchical clusters. Traversing may comprise: drilling down through the data structure of the hierarchical aggregation by identifying and locking onto one or more candidate clusters based on feedback of the user, and ending the drilling down in response to reaching one or more leaf nodes of the data structure.

In step 314, search component 122 determines if the leaf nodes have been reached. In various embodiments of the present invention, search component 122 search component 122 determines if one or more of the leaf nodes have been reached based on the drill down method. In the depicted embodiment, if search component 122 determines that one or more leaf nodes have not been reached (No step), then search component 122 advances to step 316 and repeats steps 308 through 314. In the depicted embodiment, if search component 122 determines that one or more leaf nodes have been reached (Yest step) then search component 122 advances to step 318.

In step 316, search component 122 computes feature importance of semantic features for a candidate cluster. In various embodiments of the present invention, search component 122 computes the feature importance of one or more semantic features for a candidate cluster. In some embodiments, the computed feature importance of one or more semantic features for a candidate cluster are ranked based on predetermined weights. In various embodiments of the present invention, searching component 122 computes feature importance of one or more semantic features for a candidate cluster of the one or more clusters, wherein the computed feature importance of one or more semantic features for the candidate cluster are ranked based on predetermined weights.

In step 318, search component 122 generates a snapshot of the video excerpt based on the clusters. In various embodiments of the present invention, search component 122 search component 122 generates one or more snapshots of the video excerpts in the leaf nodes.

In step 320, search component 122 displays the generated snapshot. In various embodiments of the present invention, search component 122 displays the one or more video snapshots to the user to review, via interface 106, wherein the displayed video snapshots are ranked based on a predetermined level of confidence.

Figure 4:
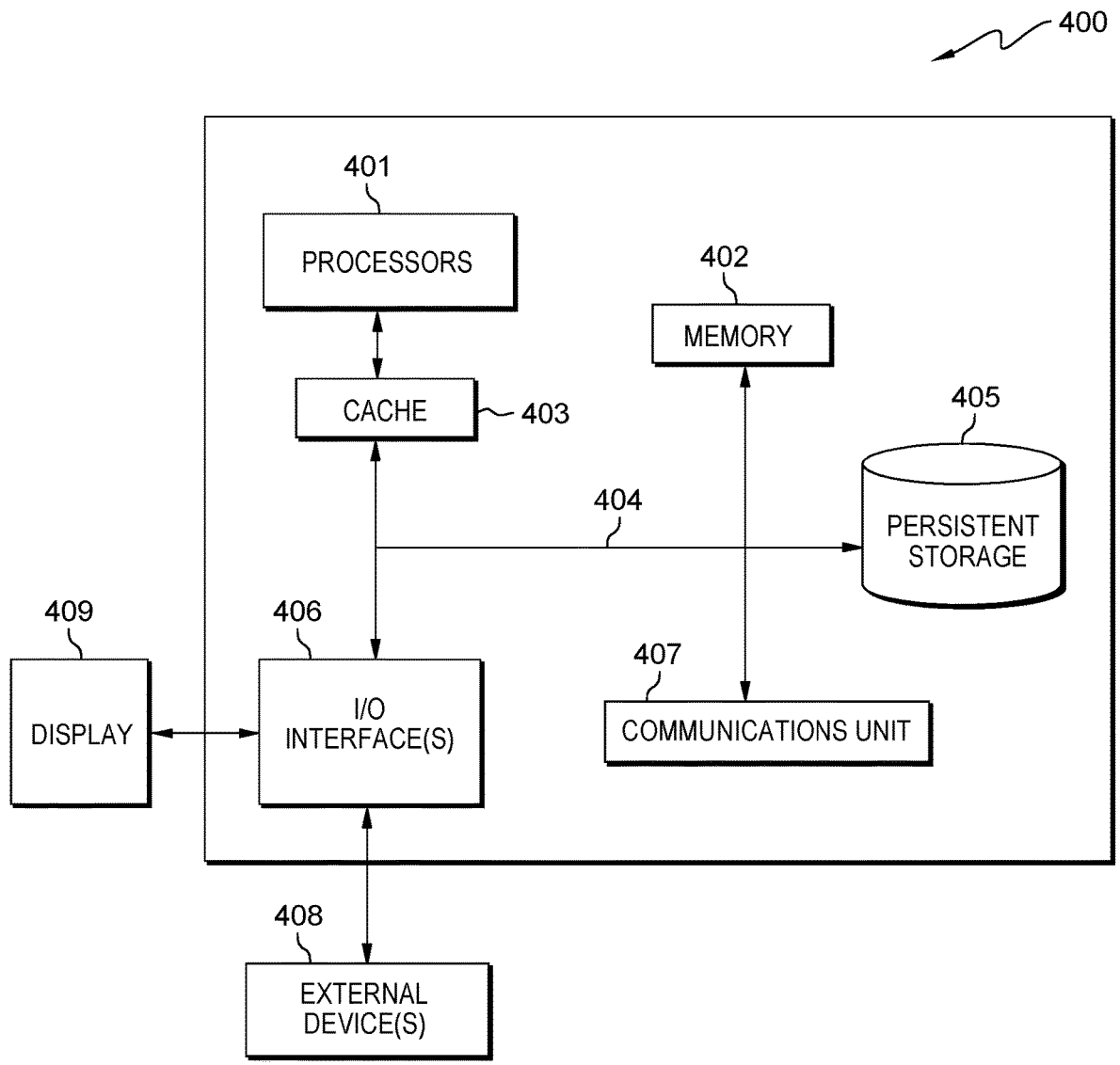
FIG. 4 depicts a block diagram of components of the server computer executing the data synchronization component within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where server computing 120 represents an example of computer system 400 that includes search component 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for heuristic video searching based on importance of semantic features, the computer-implemented method comprising:

segmenting a received video file into a plurality of segments;

removing redundant frames from the plurality of segments;

in responsive to removing redundant frames from the plurality of segments, labeling one or more remaining segments of the video as identified portions;

performing hierarchical aggregation of the parsed video into one or more clusters of video excerpts based on a plurality of video features;

computing a within-cluster feature importance for a plurality of semantic features for top level clusters;

constructing a word cloud based on within-cluster semantic features of one or more selected clusters;

displaying, by a user interface on a computing device, the word cloud to a user to guide feedback, wherein words in the word cloud are constructed based on the within-cluster semantic features, and wherein font size of words in the word cloud is based on relative importance of respective semantic features of the one or more clusters;

receiving a degree of confidence from a user associated with a choice on the element of the word cloud by the user;

traversing the one or more clusters based on a data structure of the hierarchical aggregation and the feedback;

responsive to reaching selected leaf nodes of the data structure, generating one or more snapshots of the video excerpts associated with the leaf nodes, wherein the leaf nodes are selected based on the feedback; and displaying, by the user interface on the computing device, the one or more generated snapshots of the video excerpts to the user.

2. The computer-implemented method of claim 1, wherein the traversing comprises:

drilling down through the data structure of the hierarchical aggregation by identifying and locking onto one or more candidate clusters based on the feedback; and ending the drilling down in response to reaching one or more leaf nodes of the data structure.

3. The computer-implemented method of claim 1, wherein the one or more snapshots of the video excerpts displayed to the user are ranked by the degree of confidence.

4. The computer-implemented method of claim 1, further comprising:

guiding the user to recall and choose video features that are beneficial for the video searching based on the displayed word cloud, wherein the video features having relatively higher importance value in the searching are indicated by a respective larger font size in the word cloud.

5. The computer-implemented method of claim 1, further comprising:

computing feature importance of one or more semantic features for a candidate cluster of the one or more clusters, wherein the computed feature importance of one or more semantic features for the candidate cluster are ranked based on predetermined weights.

6. The computer-implemented method of claim 1, further comprising:

receiving the feedback and an assigned confidence level from the user associated with the feedback, wherein the feedback is based on the displayed word cloud.

7. The computer-implemented method of claim 1, further comprising:

generating the word cloud based on semantic features of one or more selected clusters, wherein the word cloud is interactive and relative importance of a cluster is used to determine whether input received via feedback from the user is associated with a particular cluster.

8. A computer program product for heuristic video searching based on importance of semantic features, the computer program product comprising:

one or more computer readable storage devices and program instructions stored on the one or more computer readable storage devices, the stored program instructions comprising:

program instructions to segment a received video file into a plurality of segments;

program instructions to remove redundant frames from the plurality of segments;

in responsive to removing redundant frames from the plurality of segments, program instructions to label one or more remaining segments of the video as identified portions;

program instructions to perform hierarchical aggregation of the parsed video into one or more clusters of video excerpts based on a plurality of video features;

program instructions to compute a within-cluster feature importance for a plurality of semantic features for top level clusters;

program instructions to construct a word cloud based on within-cluster semantic features of one or more selected clusters;

program instructions to display, by a user interface on a computing device, the word cloud to a user to guide feedback, wherein words in the word cloud are constructed based on the within-cluster semantic features, and wherein font size of words in the word cloud is based on relative importance of respective semantic features of the one or more clusters;

program instruction to traverse the one or more clusters based on a data structure of the hierarchical aggregation and the feedback;

responsive to reaching selected leaf nodes of the data structure, program instruction to generate one or more snapshots of the video excerpts associated with the leaf nodes, wherein the leaf nodes are selected based on the feedback; and program instruction to display, by the user interface on the computing device, the one or more generated snapshots of the video excerpts to the user.

9. The computer program product of claim 8, wherein the traversing comprises:

program instruction to drill down through the data structure of the hierarchical aggregation by identifying and locking onto one or more candidate clusters based on the feedback; and program instruction to end the drilling down in response to reaching one or more leaf nodes of the data structure.

10. The computer program product of claim 8, wherein the one or more snapshots of the video excerpts displayed to the user are ranked by a degree of confidence.

11. The computer program product of claim 8, further comprising:

program instruction to guide the user to recall and choose video features that are beneficial for the video searching based on the displayed word cloud, wherein the video features having relatively higher importance value in the searching are indicated by a respective larger font size in the word cloud.

12. The computer program product of claim 8, further comprising:

program instruction to compute feature importance of one or more semantic features for a candidate cluster of the one or more clusters, wherein the computed feature importance of one or more semantic features for the candidate cluster are ranked based on predetermined weights.

13. The computer program product of claim 8, further comprising:

program instruction to receive the feedback and an assigned confidence level from the user associated with the feedback, wherein the feedback is based on the displayed word cloud.

14. The computer program product of claim 8, further comprising:

program instruction to generate the word cloud based on semantic features of one or more selected clusters, wherein the word cloud is interactive and relative importance of a cluster is used to determine whether input received via feedback from the user is associated with a particular cluster.

15. A computer system for heuristic video searching based on importance of semantic features, the computer system comprising:
one or more computer processors;
one or more computer readable storage devices;
program instructions stored on the one or more computer readable storage devices for execution by at least one of the one or more computer processors, the stored program instructions comprising:
  program instructions to segment a received video file into a plurality of segments;
  program instructions to remove redundant frames from the plurality of segments;
  in responsive to removing redundant frames from the plurality of segments, program instructions to label one or more remaining segments of the video as identified portions;
  program instructions to perform hierarchical aggregation of the parsed video into one or more clusters of video excerpts based on a plurality of video features;
  program instructions to compute a within-cluster feature importance for a plurality of semantic features for top level clusters;
  program instructions to construct a word cloud based on within-cluster semantic features of one or more selected clusters;
  program instructions to display, by a user interface on a computing device, the word cloud to a user to guide feedback, wherein words in the word cloud are constructed based on the within-cluster semantic features, and wherein font size of words in the word cloud is based on relative importance of respective semantic features of the one or more clusters;
  program instruction to traverse the one or more clusters based on a data structure of the hierarchical aggregation and the feedback;
  responsive to reaching selected leaf nodes of the data structure, program instruction to generate one or more snapshots of the video excerpts associated with the leaf nodes, wherein the leaf nodes are selected based on the feedback; and
  program instruction to display, by the user interface on the computing device, the one or more generated snapshots of the video excerpts to the user.

16. The computer system of claim 15, wherein the traversing comprises:
program instruction to drill down through the data structure of the hierarchical aggregation by identifying and locking onto one or more candidate clusters based on the feedback; and
program instruction to end the drilling down in response to reaching one or more leaf nodes of the data structure.

17. The computer system of claim 15, further comprising:
program instruction to guide the user to recall and choose video features that are beneficial for the video searching based on the displayed word cloud, wherein the video features having relatively higher importance value in the searching are indicated by a respective larger font size in the word cloud.

18. The computer system of claim 15, further comprising:
program instruction to compute feature importance of one or more semantic features for a candidate cluster of the one or more clusters, wherein the computed feature importance of one or more semantic features for the candidate cluster are ranked based on predetermined weights.

19. The computer system of claim 15, further comprising:
program instruction to receive the feedback and an assigned confidence level from the user associated with the feedback, wherein the feedback is based on the displayed word cloud.

20. The computer system of claim 15, further comprising:
program instruction to generate the word cloud based on semantic features of one or more selected clusters, wherein the word cloud is interactive and relative importance of a cluster is used to determine whether input received via feedback from the user is associated with a particular cluster.

* * * * *